Figure 1:
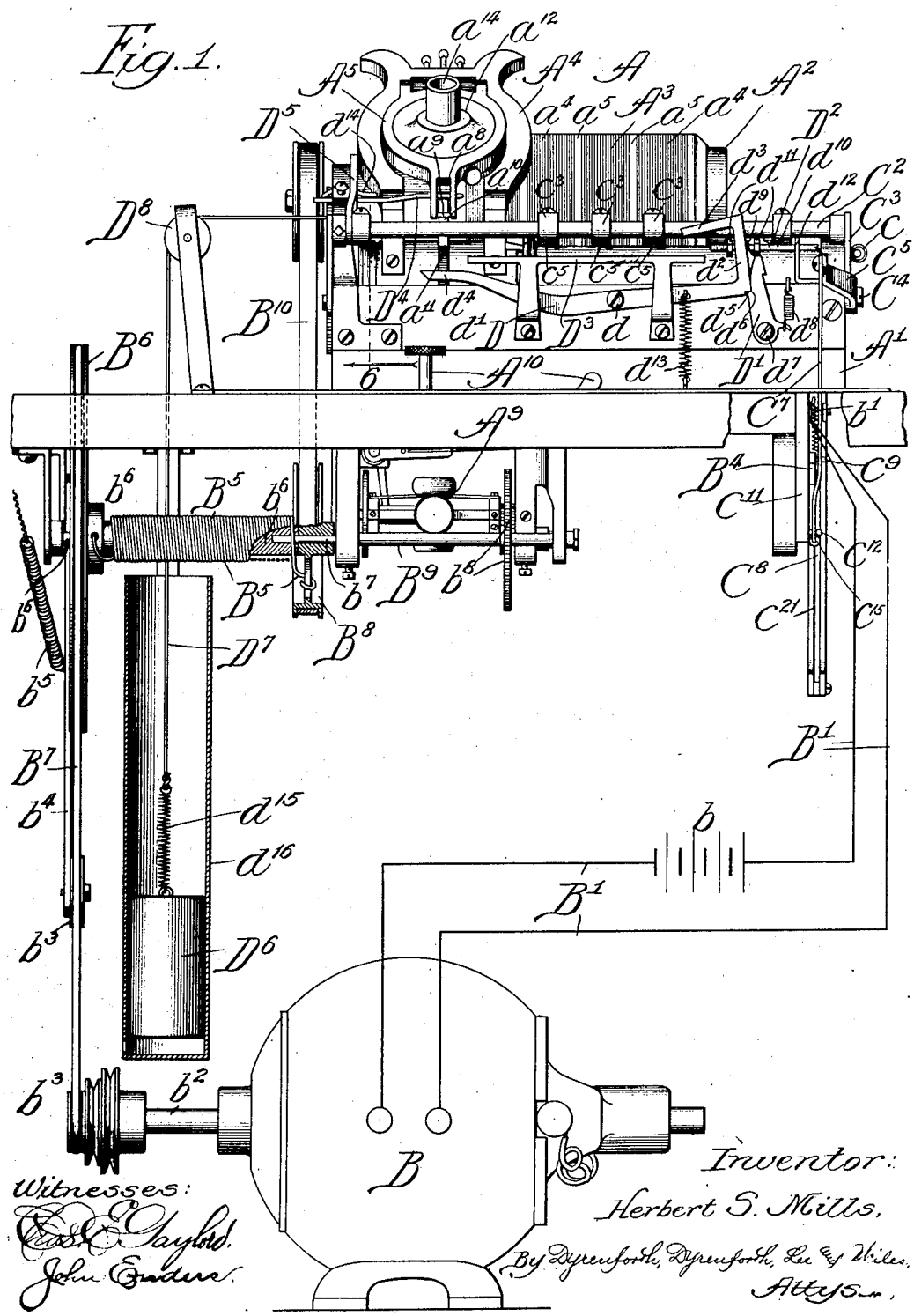

No. 876,006. PATENTED JAN. 7, 1908.
H. S. MILLS.
PHONOGRAPH AND OTHER SOUND PRODUCING MACHINE.
APPLICATION FILED JAN. 17, 1907.
5 SHEETS—SHEET 3.
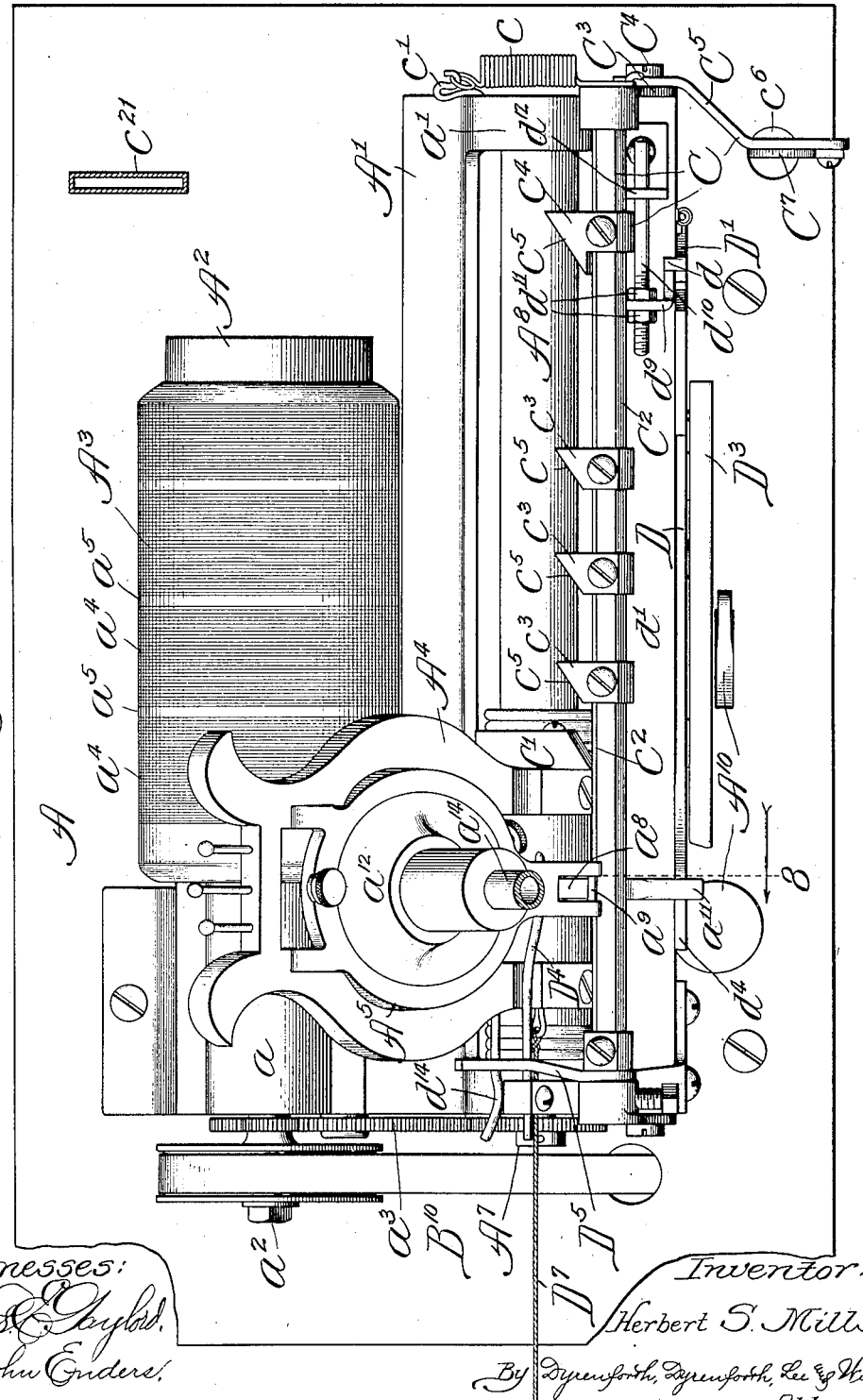

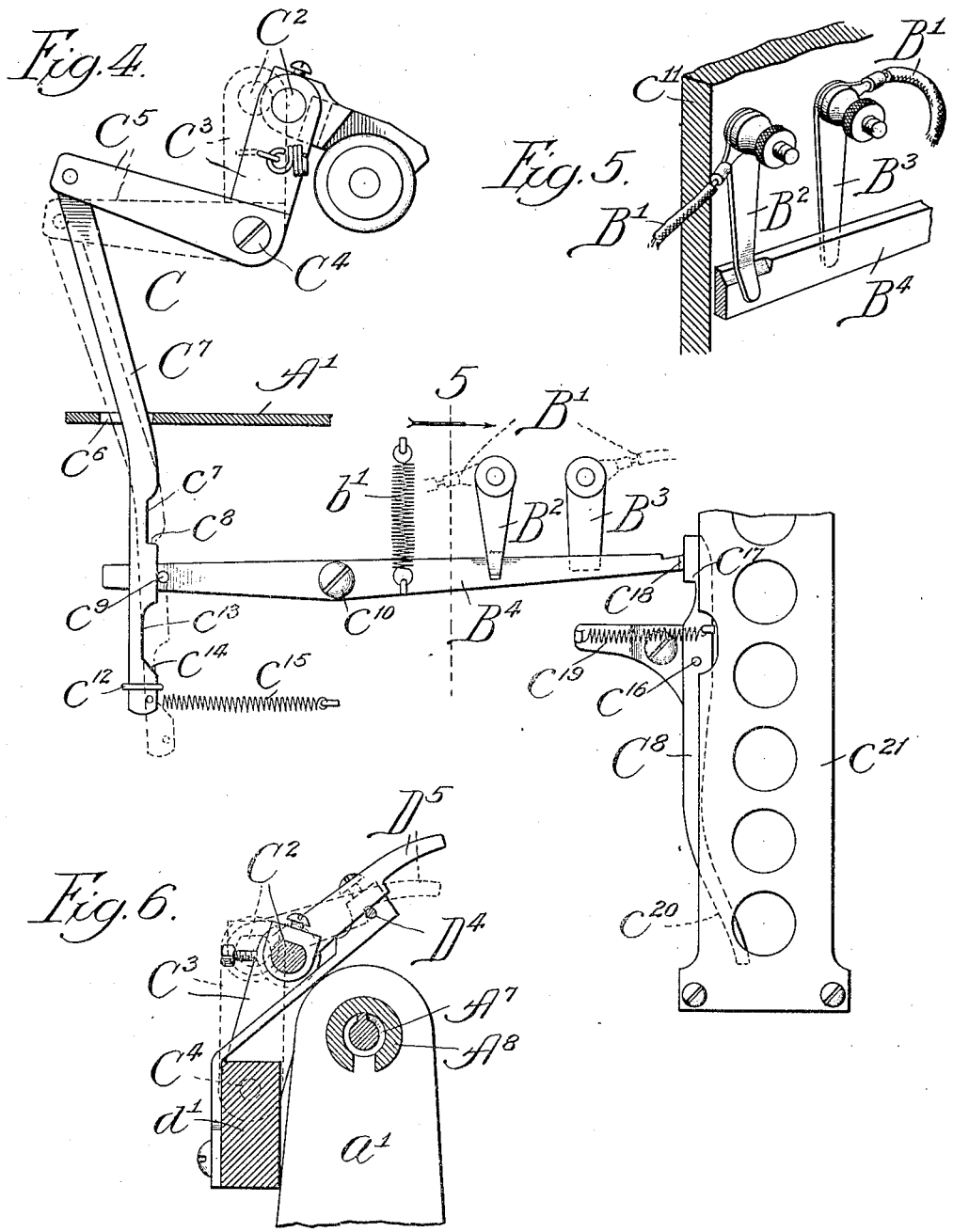
No. 876,006. PATENTED JAN. 7, 1908.
H. S. MILLS.
PHONOGRAPH AND OTHER SOUND PRODUCING MACHINE.
APPLICATION FILED JAN. 17, 1907.
5 SHEETS—SHEET 4.
Witnesses:
Inventor:
Herbert S. Mills.

No. 876,006. PATENTED JAN. 7, 1908.
H. S. MILLS.
PHONOGRAPH AND OTHER SOUND PRODUCING MACHINE.
APPLICATION FILED JAN. 17, 1907.
5 SHEETS—SHEET 5.
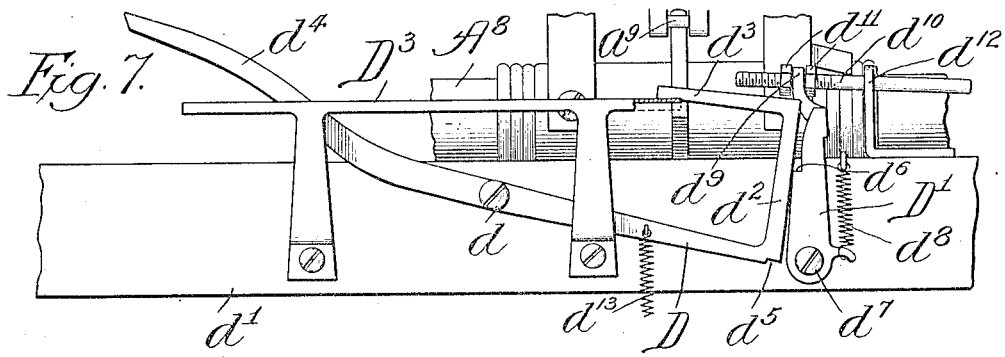
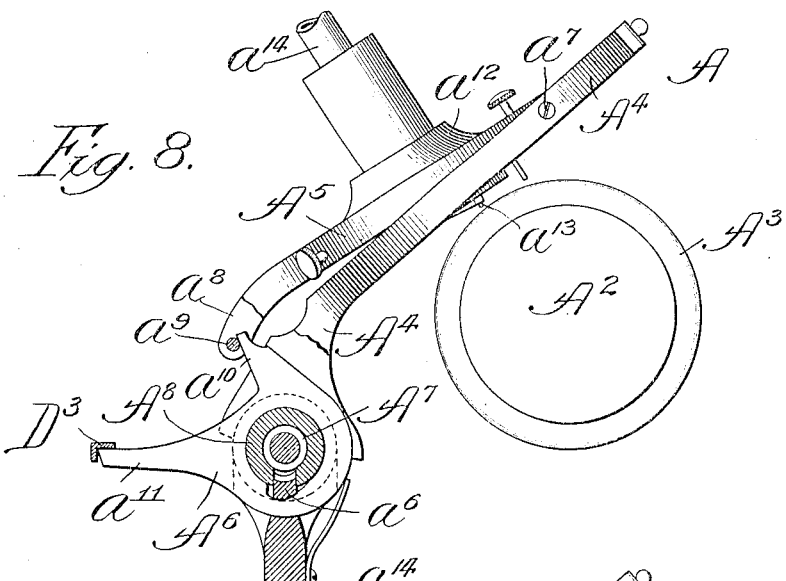
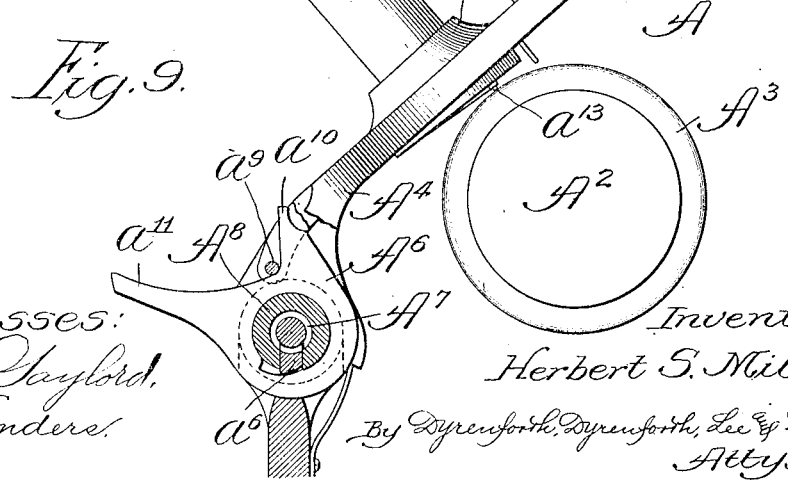
Witnesses:
Inventor: Herbert S. Mills,
By Dyrenforth, Dyrenforth, Lee & Wiles
Attys.

UNITED STATES PATENT OFFICE.

HERBERT S. MILLS, OF CHICAGO, ILLINOIS.

PHONOGRAPH AND OTHER SOUND-PRODUCING MACHINE.

No. 876,006.    Specification of Letters Patent.    Patented Jan. 7, 1908.

Application filed January 17, 1907. Serial No. 352,672.

*To all whom it may concern:*

Be it known that I, HERBERT S. MILLS, a citizen of the United States, residing at Chicago, in the county of Cook and State of Illinois, have invented a new and useful Improvement in Phonograph and other Sound-Producing Machines, of which the following is a specification.

My invention relates particularly to motor-operated sound-reproducing machines, although the invention or certain features thereof may be usefully employed in sound-producing machines generally.

My primary object is to provide simple and efficient means for minimizing the ill effects resulting from variations or fluctuations in speed of the operating motor, such, for instance, as may result from fluctuations in an electric current, where an electric motor is employed for operating the sound-producing instrument. In musical instruments, such, for instance, as a phonograph employed for reproducing music, the matter of speed regulation in the operation of the instrument is exceedingly important, since fluctuations in the speed of the record of a phonograph will result in relative changes of pitch with consequent loss of harmony of tone.

A further object of my invention is to provide means whereby a phonograph may be caused to operate two or more times before the technically so-called reproducer thereof completely traverses the record-bearing member and whereby the reproducer will finally, after completely traversing the records, be returned automatically to its original or starting position.

In the preferred embodiment of my invention as applied to phonographs, I employ in connection with a phonograph an electric motor provided with a controlling-circuit; a power-transmission torsion spring interposed between the motor and the phonograph-record which it actuates and serving to dissipate the variations in speed and transmit a substantially unfluctuating speed of rotation to the phonograph record; means whereby the controlling circuit of the motor may be interrupted when the reproducer has reached any desired intermediate point in its traverse over the record, without the return of the reproducer to its starting position; and means whereby the circuit is interrupted after the reproducer has completed its traverse across the record and the reproducer is then returned automatically to its original or starting position.

The invention is illustrated in the accompanying drawings as applied to a coin-controlled motor-actuated phonograph.

Figure 2:
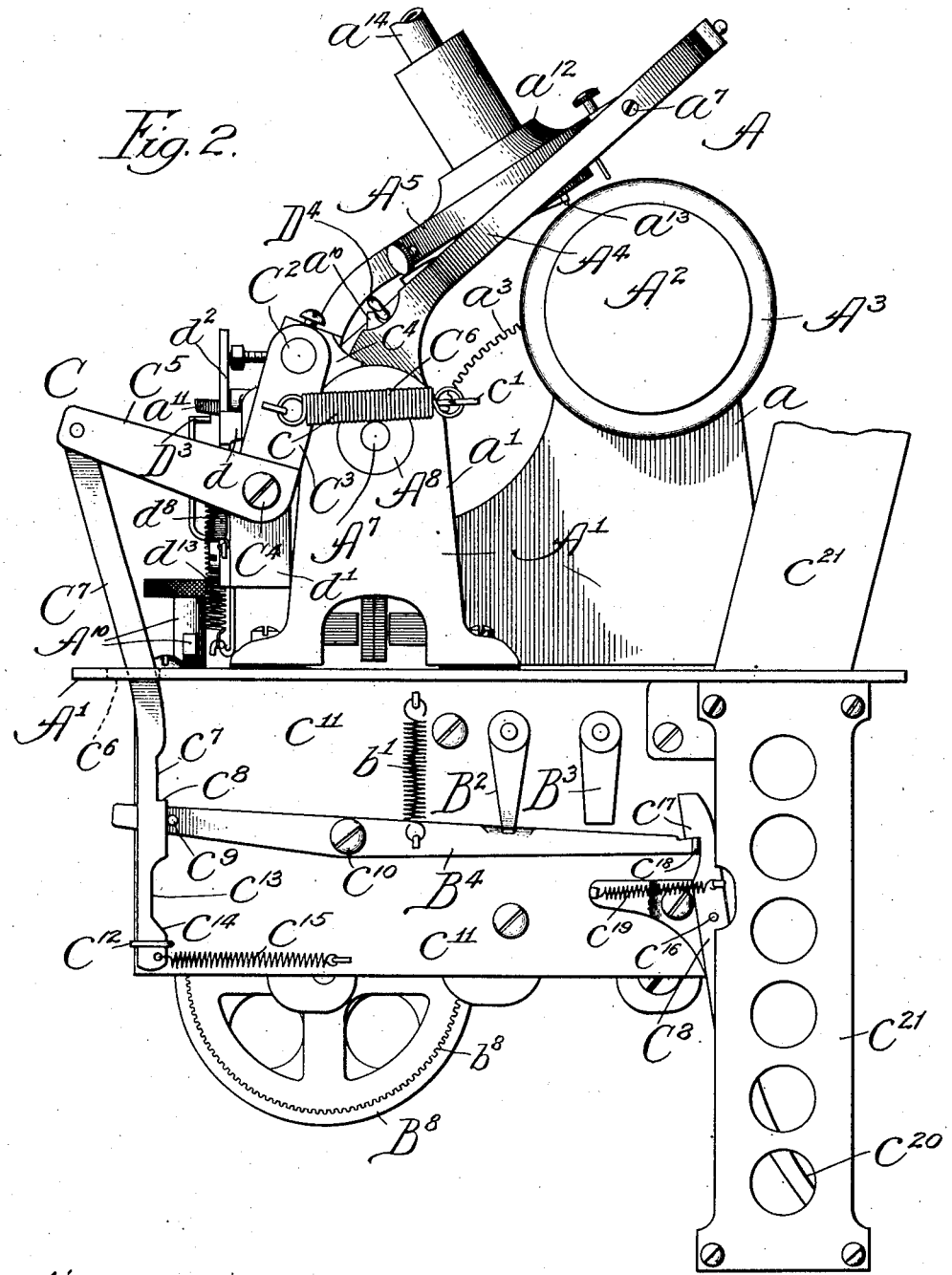

In the drawings—Figure 1 represents a broken front elevational view of a phonograph, equipped, operated and controlled in accordance with my invention; Fig. 2, an end elevational view of the same with the motor omitted; Fig. 3, a plan view of the same; Fig. 4, a view of circuit-controlling mechanism employed and taken in the same direction as the view shown in Fig. 2, the switch-lever being in a different position from its position shown in Fig. 2; Fig. 5, a sectional view in perspective, the section being taken as indicated at line 5 of Fig. 4, showing the relation of the switch to the contact points; Fig. 6, a detail section taken as indicated at line 6 of Fig. 1 and illustrating the manner in which a shiftable cam-equipped bar employed for actuating the switch of the circuit-controlling mechanism is held in a retracted position to permit the return of the reproducer-carriage without the cam carried thereby encountering the cams on said cam-shaft; Fig. 7, a front elevational view of certain parts and showing the position of said parts an instant after the retaining pawl or latch of the reproducer-elevating lever has been tripped; and Figs. 8 and 9, sections taken as indicated at line 8 of Fig. 3 and showing, respectively, the non-engaging and engaging positions of the reproducer-carriage with relation to the feed-screw which actuates said carriage during the reproducing operation.

In the construction illustrated, A represents a phonograph comprising the usual parts, namely, a frame $A^1$, record-carrier $A^2$ fitted with a cylindrical record $A^3$, reproducer-carrier $A^4$ bearing a pivoted needle-holder $A^5$ and equipped with a screw-clutch or follower $A^6$, reproducer-carrier feed-screw $A^7$ contained within the reproducer-carrier guide $A^8$ and geared to the shaft of the record-carrier $A^2$, governor $A^9$, and brake device $A^{10}$; B, an electric motor having a circuit $B^1$ fitted with switch-points $B^2$ and $B^3$ and with a switch $B^4$, as shown in Figs. 2, 4 and 5; $B^5$, a shock-absorbing power-transmission torsion-spring actuated by a wheel $B^6$ connected by a belt $B^7$ to the motor-shaft; $B^8$, a wheel attached to and actuated by the power-transmission spring $B^5$ and serving to actuate a shaft $B^9$ upon which it is fixed and also to transmit motion through a belt $B^{10}$ to the record-carrier shaft; C, circuit-controlling mechanism actuated by the reproducer and comprising a cam $C^1$ carried by the reproducer-carrier, a shiftable cam-equipped switch-actuating bar $C^2$ extending parallel with and located in front of the reproducer-carrier guide, a pair of arms $C^3$ supporting said bar and supported on pivots $C^4$, one of said arms constituting with an arm $C^5$ a bell-crank lever, a spring $C^6$ which tends to hold the bar $C^2$ in the position in which it is shown in Fig. 2, and a switch-actuating link $C^7$ depending from the free end of the arm $C^5$ of said bell-crank lever; $C^8$, a switch-locking lever which normally locks the switch-lever $B^4$ in the open position indicated in Fig. 2;
D, a needle-elevating and clutch-disengaging lever which serves, by rotating the member $A^6$ to disengage the clutch from the feed-screw and swing the holder $A^5$ to the position shown in Fig. 8; $D^1$, a latch, or pawl, which serves to lock the lever D in the position shown in Fig. 1; $D^2$, a latch-unlocking member actuated by the member $A^6$ when the reproducer-carrier reaches the end of its traverse; $D^3$, a cam which serves to hold the clutch-member $A^6$ in the disengaged position shown in Fig. 8 during the return movement of the reproducer-carrier; $D^4$, a needle-holder support upon which the holder $A^5$ rides as the reproducer-carrier, in its return movement, nears its original starting position; $D^5$, a bar-latch which serves, by engagement with the member $D^4$, as indicated by dotted lines in Fig. 6, to lock the cam-equipped bar $C^2$ in its forward, or retracted, position to permit the cam $C^1$ on the reproducer-carrier to pass the cams on the bar $C^2$ during the return movement of the reproducer-carrier; and $D^6$, a carrier-retracting weight supported by a cord $D^7$ which passes over a pulley $D^8$ and is attached to the reproducer-carrier.

The general construction of the phonograph illustrated is well understood, and it will be unnecessary to go into details, except as may be necessary to enable the description of the novel features which have been added to be understood. The frame $A^1$ has the usual standard for supporting the rotary record-carrier, and the usual standards $a^1$ in which the reproducer guide is mounted and the feed-screw journaled. Motion is communicated from the shaft $a^2$ of the record-carrier, by a train of gears $a^3$ to the feed screw $A^7$. The record $A^3$ is the usual cylindrical wax record, and as here illustrated the record cylinder has its surface divided into a plurality of records $a^4$ separated by unmarked spaces $a^5$, whereby a series of records may be reproduced during one complete traverse of the record cylinder by the reproducer. The circuit-controlling mechanism is so arranged as to stop the motor automatically after each short record $a^4$ has been reproduced. This feature is of great importance in machines known as "fortune-telling machines," or, generally, when the record cylinder is of sufficient size to contain several records. The reproducer-carrier $A^4$ is pivotally and slidably mounted on the guide $A^8$ in the usual manner, the member $A^8$ being slotted on its lower side to permit the screw-engaging member $a^6$ to engage the screw. The needle-holder $A^5$ is pivotally supported in the carriage $A^4$ on pivots $a^7$. The lower front portion of the member $A^5$ is provided with bifurcations, or arms, $a^8$ joined by a pin $a^9$. The member $A^6$ has a short arm $a^{10}$ located between the bifurcations $a^8$ of the member $A^5$ and adapted to engage the pin $a^9$; and said member $A^6$ has a longer arm $a^{11}$ adapted to be engaged by the lever D for the purpose of raising the member $A^5$ to withdraw the needle from the record, as shown in Fig. 8, and said arm $a^{11}$ is adapted to pass beneath the cam $D^3$ and hold the member $A^5$ in an elevated position during the return movement of the reproducer-carrier. It will be observed, also, that when the member $A^6$ is in the position shown in Fig. 8, the carrier is released from the feed-screw. The holder $A^5$ supports a disk $a^{12}$ by which the needle or tracer $a^{13}$ is carried, and the disk $a^{12}$ also supports the tube $a^{14}$ which connects with the ear trumpets (not shown).

The motor employed for operating the machine is preferably an electric motor, designated B. This motor may be of any approved type and any suitable circuit-controlling means may be employed. Ordinarily machines of this character are intended for operation by a current supplied from a dynamo which serves, at the same time, for various operative purposes. The current, therefore, is subject to fluctuation, and I have provided means for overcoming the ill effects of such fluctuations, which are peculiarly felt in machines adapted for the purpose of the present machine. I have shown the circuit $B^1$ equipped with a battery $b$, but this is merely for illustration. Ordinarily, the use of batteries is avoided, where possible, for reasons which will be understood by those skilled in the art.

By reference to Figs. 4 and 5 it will be seen that the circuit $B^1$ will be completed when the right-hand end of the switch-lever $B^4$ is in the elevated position shown in these figures. The switch-lever is equipped with a spring $b^1$ which tends to bring about this condition. The shaft $b^2$ of the motor is equipped with a stepped pulley $b^3$ for connection with the belt $B^7$. The belt in passing to the pulley $B^6$ passes over an idler $b^3$ carried by an arm $b^4$ which is acted upon by a spring $b^5$. The wheel $B^6$ has its hub fixed on a shaft $b^6$ which extends through the coiled spring $B^5$, abuts loosely against the hub of the wheel $B^8$, and has a bore in its end receiving the adjacent end of the shaft $B^9$. One end of the spring $B^5$ is attached to a spoke of the wheel $B^8$, so that the spring serves to actuate the wheel $B^8$. The shaft $B^9$ is connected by gears $b^8$ with the governor $A^9$ of the phonograph, said governor being of the usual construction.

The circuit-controlling mechanism C serves to automatically break the circuit after the motor has operated for a predetermined period. As shown in Figs. 2 and 3, one of the arms $C^2$ is connected by a spring $c$ with a hook $c^1$ connected with an end standard $a^1$ of the phonograph frame. This spring tends to hold the cam-equipped bar $C^2$ in the position shown in Figs. 2 and 3. The cam $C^1$ attached to the reproducer-carrier $A^4$ is provided with an oblique or beveled surface $c^2$; and the bar $C^2$ is equipped with a series of intermediate cams $c^3$ and an end-cam $c^4$, these cams having oblique or beveled surfaces $c^5$ coacting with the oblique surface $c^2$ of the cam $C^1$. The spacing of the intermediate cams corresponds with the spacing of the several records or paragraphs on the record cylinder, so that the bar $C^2$ will be actuated to cause an interruption of the motor circuit after the reproduction of each record of the record cylinder. The cam $c^4$ is longer than the cam $c^3$, that is, projects rearwardly farther than the cam $c^3$, so that when the cam $c^4$ is encountered the bar $C^2$ will be moved forward through a greater distance than when the cams $c^3$ are encountered, thereby permitting the latch $D^5$ to assume the locking position with reference to the member $D^4$, which is illustrated in dotted lines in Fig. 6, whereby the cam-equipped bar C will be held in its forward position during the return movement of the reproducer-carrier, so that the cam $C^1$ will clear the cams of the bar $C^2$.

The arm $C^5$, which is rocked downwardly when the bar $C^2$ is thrown forwardly by the action of the reproducer-carrier, serves to depress the link $C^7$ during this action. Said link moves in a guide slot $c^6$ in the base-plate of the frame $A^1$, and is provided beneath said base-plate with a slot or recess $c^7$ terminating at its lower end in an abrupt shoulder $c^8$ adapted to engage a stud $c^9$ on the front end of the switch lever $B^4$. Said switch lever is supported on a pivot $c^{10}$ carried by a frame-member $c^{11}$ depending from said base-plate. The lower end of the link $C^7$ is confined in a guide $c^{12}$, and near the lower end of said link is a slot or recess $c^{13}$ beneath which is a cam $c^{14}$ adapted to work on the front wall of the guide $c^{12}$. Connected with the lower end of the link $C^7$ and with the frame member $c^{11}$ is a spring $c^{15}$. When the link $C^7$ moves downwardly, the recess $c^{13}$ permits the lower end of said link to be swung, under the action of the spring $c^{15}$, so that the abrupt shoulder $c^8$ will engage the stud $c^9$ of the switch lever. When the arm $C^5$ is suddenly drawn upwardly under the action of the spring $c$ after a cam of the bar $C^2$ has been passed by the cam $C^1$ of the reproducer-carrier, the switch lever will be quickly actuated to interrupt the circuit of the motor; and during the final portion of the upward movement of the link $C^7$ the cam $c^{14}$ serves to release the link from the stud $c^9$, so that the parts will occupy the position shown in Fig. 2.

The latch lever $C^8$ is supported on a pivot $c^{16}$ and is provided at its upper end with a locking shoulder $c^{17}$ adapted to engage a lateral lug $c^{18}$ on the rear end of the switch lever $B^4$. A spring $c^{19}$ tends to move the upper end of the lever $C^8$ towards the switch lever $B^4$. The lever $C^8$ occupies substantially a vertical position, and has a rearwardly curved lower end $c^{20}$ which projects into a coin-chute $c^{21}$. When the lower end of the latch lever $c^{20}$ is swung forwardly, as will happen if a coin is dropped into the chute $c^{21}$, the latch will be disengaged from the locking position shown in Fig. 2, and permit the spring $b^1$ to elevate the rear end of the switch lever and complete the electric circuit, as shown in Fig. 4. This position of the switch lever will be maintained until the link $C^7$ is again depressed and elevated to actuate the switch lever and break the circuit.

The lever D which serves to elevate the needle holder of the reproducer and to disengage the reproducer-carrier from the feed-screw is supported on a pivot $d$ carried by a frame-member $d^1$. The lever lies in a plane parallel with the plane of the cam bar $C^2$; and, as shown in Figs. 1 and 7, has at its right-hand end an upwardly extending arm $d^2$ which is equipped with an arm $d^3$ which extends from the arm $d^2$ towards the left-hand end of the machine. The left-hand end of the lever D is curved upwardly and to the left, as indicated at $d^4$. At the right-hand end of the lever D and at the base of the standing arm $d^2$ is a locking shoulder $d^5$ which serves to engage a locking shoulder $d^6$ with which the pawl $D^1$ is provided. Said pawl $D^1$ is supported on a pivot $d^7$ and is normally held in engagement with the lever D by a spring $d^8$. The upper end of the pawl $D^1$ is provided with a perforate ear $d^9$ which receives a short threaded rod $d^{10}$ equipped with adjustable nuts $d^{11}$. The rod $d^{10}$ moves in a guide $d^{12}$. The left hand end of the member $d^{10}$ is in the path of the arm $a^{11}$ of the member $A^6$ of the reproducer, so that when the reproducer-carrier reaches the final end of its traverse, the pawl $D^1$ will be actuated to release the lever D and permit the spring $d^{13}$ of said lever to depress the right-hand end of the lever, the arm $a^{11}$ of the member $A^6$ passing, in the meantime, beneath the arm $d^3$ of the lever D, so that when the lever D is actuated by its spring, the member $A^6$ will be rotated to release the reproducer-carrier from the feed-screw and at the same time raise the needle-holder $A^5$ to withdraw the needle from the record. The instant this occurs, the weight $D^6$ operates to retract the reproducer-carrier, the arm $a^{11}$ of the member $A^6$ passing from beneath the arm $d^3$ of the lever D beneath the cam $D^3$, so that the reproducer-carrier will be held out of engagement with the feed-screw and the needle-holder will be held elevated during the return movement of the reproducer-carrier. During the return movement of the reproducer-carrier, the arm $a^{11}$ will encounter the cam portion $d^4$ of the lever D and restore the lever D to its normal position. Before the arm $a^{11}$ passes from beneath the left-hand end of the cam $D^3$, the stud $D^4$ will be received beneath the arms $a^8$ of the needle-holder so as to support said needle-holder for an instant at the beginning of the next operation of the machine. In the meantime because of the loose connection between the short arm $a^{10}$ and the needle-holder $A^5$, the member $A^6$ will return to its normal position, thereby connecting the reproducer-carrier again with the feed-screw. An instant after the machine is again set in operation, the needle-holder will drop off the support $D^4$ and bring the needle again into contact with the record. Inasmuch as the cam bar $C^2$ is held in a retracted position by the latch $D^5$ during the return movement of the reproducer-carrier, it is necessary to provide means for releasing the latch from the member $D^4$ to permit the bar $C^2$ to assume its normal position. For this purpose the reproducer-carrier is equipped with a cam $d^{14}$ which engages the free end of the pawl $D^5$ when the reproducer-carrier reaches the left-hand end of its traverse and disengages the pawl from the member $D^4$. The cam $d^{14}$ is shown as a short curved wire projecting to the left from the carrier $A^4$, as shown in Fig. 3. The pawl $B^5$ is pivoted on the left-hand end of the bar or shaft $C^2$, as shown in Figs. 1 and 3.

I preferably connect the cord $D^7$ with the weight $D^6$ through the medium of a spring $d^{15}$, and confine the weight in a guide-cylinder $d^{16}$ in which a certain amount of air cushioning occurs, the whole arrangement being intended to prevent shock to the delicate parts of the mechanism.

From the foregoing description, the operation will be readily understood. When it is desired to operate the phonograph, the lower end of the latch-lever $c^{20}$ is swung forwardly, as by dropping a coin into the chute $c^{21}$, thereby unlatching the switch-lever $B^4$, whose spring $b'$ thereupon operates to elevate the rear end of the switch-lever and make connection between the switch-points $B^3$, $B^3$, thereby establishing the circuit of the electric motor. Thereupon, the motor, through the medium of the wheel $B^6$, rotates the power-transmission coil-spring $B^5$, thereby communicating motion to the wheel $B^8$, and thence through the shaft $B^9$ to the governor $A^9$, and through the belt $B^{10}$ to the record-carrier, and from the record-carrier through the gear train $a^3$ to the feed-screw which actuates the reproducer-carrier. A moment after the reproducer-carrier starts to the right from the position shown in Fig. 1, the needle-support $A^5$ drops off the supporting member $D^4$, allowing the needle to come into contact with the cylinder. During the movement of the reproducer to the right, the arm $a^{11}$ of the member $A^6$ travels above the cam $D^3$. When the cam $C^1$ encounters the first cam $c^3$ on the bar $C^2$, the bar $C^2$ is shifted forwardly a sufficient distance to depress the link $C^7$ so that it will engage the stud $c^9$. After the cam $C^1$ passes the first of the cams $c^3$, the bar $C^2$ is suddenly returned under the action of the spring $c$, thereby elevating the bar $C^7$ and breaking the circuit. This action, it is noteworthy, is accomplished without the release of the reproducer-carrier from the feed-screw, and the movement of the bar $C^2$ is not sufficient to permit the pawl $D^5$ to lockingly engage the member $D^4$ so as to hold the bar $C^2$ in its forward position. The only effect, therefore, is to interrupt the circuit and stop the motor. The circuit may be reëstablished by again actuating the lever $c^{20}$ to release the switch-lever. The action just described is repeated when any one of the intermediate cams $c^3$ of the bar $C^2$ is encountered and passed by the cam $C^1$ of the reproducer-carrier. When the cam $C^1$ encounters the cam $c^4$ of the bar $C^2$, the bar $C^2$ is shifted a greater distance, and the pawl $D^5$ is permitted to assume the locking position indicated by the dotted lines in Fig. 6. This is accomplished an instant before the arm $a^{11}$ of the member $A^6$ of the reproducer-carrier encounters the member $d^{10}$ and through the medium thereof actuates the pawl $D^1$ to release the needle-elevating lever D. When the lever D is released, it operates to turn the member $A^6$ on its pivot, elevate the needle-holder and release the reproducer-carrier from the feed-screw, the weight $D^6$ then operating to return the reproducer-carrier to its starting position. During this return movement, the arm $a^{11}$ passes beneath the cam $D^3$, maintaining the disconnection between the reproducer-carrier and the feed-screw and holding the needle away from the record. In the return movement, the arm $a^{11}$ encounters the cam $d^4$ and restores the lever D to its original position. An instant before the arm $a^{11}$ passes from beneath the left-hand end of the cam D³, the supporting member D⁴ is received beneath the arms a⁸ of the member A⁵, and an instant later the cam d¹⁴ encounters the free end of the pawl D⁵ and releases the cam-bar C², permitting it to assume its normal position. It is noteworthy that the lever D aids in restoring the member A⁶ to the position in which connection with the feed-screw is made at the instant that the arm a¹¹ passes from beneath the left-hand end of the cam D³.

The foregoing detailed description has been given for clearness of understanding only, and no undue limitation is to be understood therefrom. It may be stated that the power-transmission spring B⁵ may be of any suitable length and strength to enable it to successfully perform its function under varying conditions. It is noted that while the spring rotates bodily during the transmission of power, it also yields throughout its length, when fluctuations in speed of the electric motor occur; and, owing to the resilience of the spring, the operation of the phonograph is continued in an even manner, regardless of said fluctuations.

In practice, the governor tends to retard the operation of the machine in a greater or lesser degree, depending upon the speed transmitted to the governor, thereby tending to uniformity of movement of the record and reproducer of the phonograph. This action of the governor is supplemented by the resilience of the spring B⁵, which introduces a steadying effect which no governor is delicate enough and quickly responsive enough to effect; and it is to be observed, there is also possibility of slippage of the belt B⁷ upon its pulleys, which further supplements said action, so that there are three factors tending to uniformity of movement of the record and reproducer. As a matter of practice, there always is employed an electric motor capable of developing, on the weakest current supplied by the circuit, a speed in excess of that transmitted to the wheel B⁶, so that there always is more or less slippage of the belt B⁷.

It is noteworthy that my invention enables the use of storage-batteries to be dispensed with as a source of power for automatic phonograph-machines, without necessitating the use of an automatically rewound spring-motor between the electric motor and the phonograph. In other words, I am enabled, by my invention, to take the power directly from an electric-motor operated from a line current and obtain the most satisfactory results from the standpoint of reproduction of music, while at the same time eliminating expensive mechanism and rendering the machine more simple, more durable, and easier of operation and maintenance, besides greatly reducing the cost of the machine. The great importance of these results will at once be appreciated by all persons experienced in the art.

What I regard as new, and desire to secure by Letters Patent, is—

1. The combination with a movable sound-producing member of a sound-producing machine, of an electric motor operating continuously during the reproducing operation, a member driven by said motor, a power transmission spring connected to said driven member, and means connecting said spring to said sound producing member whereby said sound-producing member is driven by said motor through said spring, and the variations in the speed of the motor is absorbed by the spring, so that the sound-producing member is moved at a constant speed.

2. The combination with a phonograph, of an electric motor, a power transmission spring serving to actuate an operative part of said phonograph, means for transmitting power from said electric motor to said power transmission spring capable of slippage when the pull from the motor exceeds a predetermined maximum.

3. The combination with a phonograph, of an electric motor, a power transmission spring serving to actuate an operative part of said phonograph, and belt and pulley connections between said electric motor and said transmission spring.

4. The combination with a phonograph and an electric motor operating continuously during the operation of the phonograph and serving as a source of power therefor, of power-transmitting and motion regulating means for the phonograph, comprising a governor, and a resilient transmission spring rotated by the electric motor and transmitting power therefrom to the phonograph.

5. The combination with a phonograph and an electric motor serving as a source of power therefor, of power transmission and motion regulating means comprising a governor, a power transmission spring serving to actuate the phonograph and governor, and friction transmission means between said power transmission spring and said electric motor permitting acceleration of the speed of the motor without undue acceleration of the speed of the power transmission spring.

6. The combination with a phonograph having a record-carrier and reproducer-carrier, of an electric motor having a circuit, a power-transmission spring, means for transmitting power from said motor to said power transmission spring, said means being capable of slippage when the pull from the motor exceeds a predetermined maximum, means for transmitting motion from said power-transmission spring to said record-carrier and reproducer-carrier during operation of said motor and rotation of said spring, and automatic circuit-controlling means.

7. The combination with a phonograph having a record-carrier and a reproducer carrier, of an electric motor having a circuit, a power-transmission spring, means for transmitting power from said motor to said power-transmission spring, said means being capable of slippage when the pull from the motor exceeds a predetermined maximum, means for transmitting motion from said power-transmission spring to said record-carrier and reproducer-carrier during operation of said motor and rotation of said spring, a governor for the phonograph, and automatic circuit-controlling means.

8. The combination with a phonograph having a record carrier and reproducer carrier, of an electric motor having a circuit, a power transmission spring, pulley and belt connection between the electric motor and said transmission spring, means for transmitting motion from said power transmission spring to said record-carrier and reproducer-carrier during operation of said motor and rotation of said spring, and automatic circuit controlling means.

9. The combination with a phonograph having a record-carrier and a reproducer-carrier, of an electric motor having a circuit, a wheel actuated by said electric motor and having a power-transmission coil-spring actuated thereby, a wheel actuated by said coil-spring, means for transmitting motion from said second-named wheel to the record-carrier and from the record-carrier to the reproducer-carrier, a governor for the phonograph, means for transmitting motion from said second-named wheel to said governor, and circuit-controlling means actuated by the reproducer-carrier.

10. The combination with a phonograph having a record-carrier and reproducer-carrier, of an electric motor serving to operate the phonograph, said motor having a circuit, circuit-controlling means operative to interrupt the circuit a plurality of times during one complete traverse of the reproducer-carrier, and means for automatically returning the reproducer-carrier to its starting position after it has completed its traverse.

11. The combination with a phonograph having a record-carrier and reproducer-carrier, of an electric motor serving to operate the phonograph, said motor having a circuit, circuit-controlling means comprising a switch-actuating cam-equipped member, and a co-operating cam on the reproducer-carrier.

12. The combination with a phonograph having a record-carrier and reproducer-carrier, of an electric motor serving to operate the phonograph, said motor having a circuit, circuit-controlling means comprising a switch-actuating member equipped with a plurality of cams, and a cam carried by the reproducer-carrier and coöperating with said first-named cams.

13. The combination with a phonograph having a record-carrier and a reproducer-carrier, of a motor having a circuit, and a circuit-controlling means comprising a shiftable switch-actuating member equipped with a plurality of cams, one of said cams projecting farther than the others, and a cam carried by the reproducer-carrier and co-acting with said first-named cams.

14. The combination of a phonograph having a record-carrier and reproducer-carrier, a feed-screw, releasable means connecting the reproducer-carrier with said feed-screw, a motor having a circuit, a switch-actuating member equipped with a plurality of cams, one of said cams projecting farther than the others, a cam on the reproducer-carrier co-acting with said first-named cams, means for locking said first-named cam-equipped member in a retracted position to permit return of the reproducer-carrier, and means for raising the reproducer-needle and returning the reproducer-carrier to its original position.

15. The combination with a phonograph having a record-carrier and a reproducer-carrier, of a feed-screw for the reproducer-carrier, releasable connecting means between the reproducer-carrier and said feed-screw, a motor having a circuit, circuit-controlling means comprising a switch-actuating member equipped with a cam, a cam carried by the reproducer-carrier co-acting with said first-named cam, and means for raising the needle-holder of the reproducer and maintaining it in a raised position during the return movement of the reproducer-carrier.

16. In mechanism of the character described, the combination with the reproducer of a phonograph and a feed-screw therefor, of releasable connecting means between the reproducer-carrier and said feed-screw, a shiftable bar equipped with a plurality of cams, a cam carried by the reproducer-carrier, a circuit-controlling switch actuated by said shiftable bar, a lever serving to raise the needle-holder of the reproducer and disengage the reproducer-carrier from its feed-screw, and means for returning the reproducer-carrier to its starting position.

17. In mechanism of the character described, the combination with the reproducer of a phonograph, and a feed-screw therefor, of a clutch-releasing and needle-holder elevating member, a motor having a circuit, circuit-controlling means actuated by the reproducer-carrier, a spring-actuated lever serving to operate said clutch-releasing member, a cam serving to hold said clutch-releasing member in the disengaged position during the return movement of the reproducer-carrier, and means for returning the reproducer-carrier to its starting position.

18. In mechanism of the character described, the combination with the clutch-releasing member of the reproducer-carrier of a phonograph, of a spring-actuated lever having a member serving to engage said clutch-releasing member, and a cam beneath which said clutch-releasing member passes during the return movement of the reproducer-carrier.

19. In mechanism of the character described, the combination with the clutch-releasing member of the reproducer-carrier of a phonograph, of a pivoted spring-actuated lever having a member beneath which an arm of said clutch-releasing member is adapted to pass and having at its opposite end a cam-portion, a stationary cam beneath which the arm of the clutch-releasing member is adapted to pass during the return movement of the reproducer-carrier, a pawl normally holding said lever against the action of its spring, actuating means for said pawl operated by the reproducer-carrier, and means for returning the reproducer-carrier to its starting position.

20. The combination with the clutch-releasing member of the reproducer-carrier of a phonograph, of an actuating lever for the clutch releasing member which is mounted on the frame of the machine, a locking pawl serving normally to hold said lever in an inoperative position, and adjustable actuating means for said locking pawl actuated by the reproducer carrier.

21. The combination with the clutch releasing member of a reproducer-carrier of a phonograph, of a lever D having a member $d^3$ serving to engage an arm of the clutch-releasing member and having a cam-portion $d^4$, a stationary cam $D^3$ adapted to engage the arm of the clutch-releasing member after said arm passes from beneath the member $d^3$, and a locking pawl $D^1$ for said lever.

22. The combination with a phonograph having a record-carrier, a reproducer-carrier, a feed-screw and a clutch-releasing and needle-holder elevating member, of means for actuating the record-carrier and the feed-screw, a lever serving to actuate the clutch-releasing and needle-holder elevating member, a stationary cam serving to engage said member during the return movement of the reproducer-carrier, and a needle-holder support serving to engage the needle-holder as the reproducer-carrier nears its starting position.

23. The combination with a phonograph having a record carrier, a reproducer-carrier, a feed-screw, a needle-holder, and a clutch-releasing and needle-holder elevating member, of a motor having a circuit, a switch-actuating member equipped with a plurality of cams, one of said cams being of greater extent than the others, a locking pawl for said cam-equipped member, a cam carried by the reproducer-carrier, and means for releasing said locking pawl when the reproducer-carrier returns to its original position, thereby permitting said cam-equipped member to assume its normal position.

24. The combination with a reproducer-carrier equipped with a cam, of a shiftable bar equipped with a plurality of cams, a bell-crank lever actuated by said bar, a switch-actuating link actuated by said bell-crank lever, and a switch-lever actuated by said link.

25. The combination with the reproducer-carrier of a phonograph, of a cam carried by said carrier, a shiftable bar equipped with a plurality of cams, a link actuated by said bar and provided with a shoulder, a switch-lever provided with a shoulder adapted to be engaged by said first-named shoulder, a spring serving to hold said cam-equipped bar in its normal position, a spring serving to actuate the switch-lever, and a latch-lever for the switch-lever.

26. The combination with the reproducer-carrier of a phonograph, of a cam carried thereby, a shiftable bar, a plurality of adjustable cams mounted on said bar, a switch-actuating link actuated by said bar, and a circuit-controlling switch actuated by said link.

27. The combination with a phonograph having a record-carrier, a reproducer-carrier, a feed-screw, and a clutch-releasing and needle-holder elevating member, of a cam carried by the reproducer-carrier, a bar extending parallel with the front of the machine in front of the reproducer-carrier, a cam on said bar, switch-operating means actuated by said bar, means for actuating the clutch-releasing member, and a cam for engaging the clutch-releasing member during the return movement of the reproducer-carrier.

28. The combination with the reproducer-carrier of a phonograph, of a cam mounted thereon, a cam-equipped member actuated by said cam, a link actuated thereby and provided with a shoulder and with a cam, a switch-lever having a shoulder adapted to engage said first-named shoulder, a spring serving to actuate said switch-lever, and a latch-lever for the switch-lever.

29. The combination with a phonograph having a record-carrier and reproducer-carrier, of a record-bearing member having a series of records on its surface, a motor, means for stopping the movement of the record-carrier and reproducer-carrier when the reproducer-carrier is at a point corresponding with a space between records, and means for stopping the record-carrier and returning the reproducer-carrier to its original starting position after the reproduction of the final record of the series.

30. The combination with a phonograph having a record-carrier, a reproducer-carrier, a feed-screw and a clutch-releasing member, of a record-bearing member having a series of records on its surface, an electric motor having a circuit, a circuit-controlling switch, a cam carried by the reproducer-carrier, a switch-actuating member having a plurality of cams, the last one of which is of greater size than the others, trip-mechanism actuated by the reproducer-carrier at the final end of its traverse and serving to actuate the clutch-releasing member, means for locking the switch-actuating member in a retracted position, and means carried by the reproducer-carrier for releasing said switch-actuating member when the reproducer-carrier returns to its original starting position.

HERBERT S. MILLS.

In presence of:
FRANK S. WILDER,
J. S. RYAN.